UNITED STATES PATENT OFFICE.

CARLETON ELLIS, OF MONTCLAIR, NEW JERSEY.

NICKEL-FORMATE CATALYZER AND PROCESS OF MAKING SAME.

1,296,496.  Specification of Letters Patent.  Patented Mar. 4, 1919.

No Drawing.    Application filed November 15, 1917.  Serial No. 202,170.

*To all whom it may concern:*

Be it known that I, CARLETON ELLIS, a citizen of the United States, and a resident of Montclair, in the county of Essex and State of New Jersey, have invented certain new and useful Improvements in Nickel-Formate Catalyzers and Processes of Making Same, of which the following is a specification.

This invention relates to the preparation of nickel formate and to its conversion into a catalytic body suitable for the hydrogenation of fatty oils and the invention will be described beginning with the preparation of nickel nitrate from metallic nickel and the conversion of the nitrate into the formate, yielding a salt of a character suitable for the production of the catalytic material.

The desired quantity of metallic nickel is placed in suitable stoneware pots and nitric acid of about 50% strength added in the proportion of 5 parts nitric acid to 1 part of nickel; the reaction takes place rather slowly at first but later may become quite violent. An excess of nickel should be added so as not to have an undue excess of nitric acid in the nitrate solution. A portion of the nickel salt will crystallize out in the bottom of the pots. In order to obviate the necessity of determining the nickel content of this mixture of solution and crystals, it is well to weigh the nickel placed in the pots and afterward weigh the undissolved nickel; the difference between these will give tl e amount of nickel in solution from which the composition of the finished catalyzer may be computed.

The mixture of nickel nitrate solution and crystals is then transferred to a suitable tank and diluted with water sufficient to make a solution of about 5% strength. Sufficient caustic soda or sodium carbonate solution (of about 10% strength) is placed in a precipitation tank and which is heated to near the boiling point. The nickel nitrate solution is then run into the alkali solution while agitating with compressed air or steam; a great excess of caustic soda should be avoided.

In case ammonia is available for the precipitation of nickel in place of caustic soda or sodium carbonate, the nickel nitrate solution previously prepared is diluted to a sufficient quantity to make about a 5% solution. About 1 to 2% solution of ammonia is placed in another suitable tank. The dilute solution of nickel nitrate is heated nearly to boiling and the dilute ammonia run in. It is necessary to work in such dilute solutions when using ammonia due to the fact that nickel hydrate is fairly soluble in excess ammonia solutions. Care should therefore be taken not to add an excess of ammonia, enough being added merely to precipitate the nickel. The point at which sufficient ammonia is present to dissolve nickel hydrate can readily be detected by the fact that a deep blue coloration is observed as soon as all the nickel is precipitated and an excess of ammonia present. Due to the fact that when the nickel hydrate is once in solution in ammonia there is difficulty in reprecipitating it, care should be taken not to have an excess of ammonia, otherwise a loss of nickel will be experienced. The product is then pumped into another tank and thoroughly washed by decantation. After washing the precipitate is pumped through a filter press and again washed with water until the wash waters come away free from salts. The cake from the filter press is transferred to enameled pans and dissolved in 20% formic acid. The heating of these pans is continued until the material goes to dryness; care must be taken in drying nickel formate, otherwise the organic salt will become blackened and partially decomposed, which should be avoided. This decomposition, however, does not take place at the temperature of boiling water.

The dried material is now transferred to a ball mill and ground to a very fine powder. After being ground the material is transferred to a decomposition tank, mixed with a quantity of oil, sufficient to make about a 20% catalyzer in oil and agitated at a temperature of from 240-250° C. for about one hour or until the entire mass of oil is entirely blackened and no particles of undecomposed formate can be detected floating in the oil. Samples may be drawn from time to time to determine this point. After decomposition is complete, the mixture of oil and catalyzer is pumped into a hydrogenator or converter and mixed with a fresh supply of oil, sufficient to make a nickel content of about ½ of 1%, To the charge of oil and catalyzer may be added a quantity of silex, or the like, to assist in filtration. The oil used as the vehicle in which the nickel formate is decomposed should be clean and as free as possible from free fatty acid. Cottonseed oil or soy bean oil containing not over 1 or 2% of free fatty acid may be used.

The following points should be considered in connection with the preparation of a successful catalyzer by the foregoing process. It is desirable and in fact important to have the acid and alkali solutions used for the operation free from catalyzer poisons such as chlorin and sulfur. Although in washing the hydrate or hydrated carbonate of nickel prepared by precipitation of the nickel nitrate with alkali, most of the salts are removed, there is difficulty in eliminating the final residues or traces of chlorin and the like, as, through some occluding effect of the precipitate these impurities are held back and remain in the catalyzer to impair or destroy its effectiveness. By taking the precaution of having the initial reagents practically free from catalyzer poisons and by thorough washing with this end in view, the hydrated material is obtained in a form capable of yielding a formate of the desired purity from the standpoint of the present catalytic process. It is desirable in order to secure a catalyzer of a highly active character to exercise great caution in drying the nickel formate to avoid decomposition, producing nickel oxids and the like. Since this undesirable change is accompanied by blackening it is possible to regulate the drying so as to preserve the color of the nickel formate crystals or masses thereby keeping the product in the best possible condition for the subsequent operation of decomposition in oil. The grinding is preferably done in an enameled vessel as an iron container is liable to be affected by the formic acid salt, especially if the latter is the acid salt. The grinding should be carried out to produce a fine powder in order that the particles of the catalyzer may be mixed intimately with the oil so that on decomposition no large masses of nickel or nickel material will be found to agglomerate and give unsatisfactory results but will instead yield a finely-divided precipitate or colloidal nickel catalyzer of a desirably active character. The heating of the finely-divided or ground nickel formate preferably should be carried out with slow agitation, and if desired the material may be heated in the agitating vessel under reduced atmospheric pressure. Whether the latter is used or ordinary atmospheric pressure there is no occasion for the introduction of a reducing gas, although if desired an inert gas of the nature of nitrogen, for example, may be blown through the oil and nickel material during the decomposition period or some part thereof. By this procedure a catalyzer concentrate is obtained which is added as desired to the oil to be hardened. While it is desirable to use in the suspensory oil employed for decomposition an oil of like nature to that which is to be hardened, it is not necessary in all cases to do this but an oil of a different character such as fatty oil of one kind or another or mineral oil, paraffin wax and the like may be used as the suspensory medium, the catalyzer filtered therefrom and added to the oil which is to be hardened in the proportion desired.

In treating the basic nickel material, that is to say, in the present case, nickel hydrate or hydrated carbonate of nickel, with formic acid, if the hydrate is used in a freshly precipitated condition, solution will take place readily and the formic acid will take up practically the equivalent amount of nickel material to produce nickel formate of a neutral or normal character and furthermore by using an excess of the nickel material, basic nickel formate may be prepared. On the other hand, if the precipitate of nickel is dried, especially if too strongly dried, and is then treated with formic acid, the action is relatively very slow. The nickel does not dissolve to yield a neutral or normal salt in an advantageous manner and usually a residue of undissolved nickel material remains which has to be removed. These difficulties and objections are overcome by employing the freshly precipitated nickel which enables the production of the formate containing a maximum amount of nickel. This results in a saving in cost of manufacture as less formic acid is required. In view of the slowness with which organic acids combine it is quite important to employ the precipitated material as described in preparing formate but the application is not limited thereto.

Further in regard to the drying operation it should be stated that while it is desirable to avoid heating the nickel formate to a temperature at which the salt blackens, it should be understood that it is advantageous to remove substantially all the water present so as to eliminate water of crystallization and the like as the foaming and priming produced on heating the moist salt in the oil especially in a closed container and particularly when a vacuum is used it is highly objectionable.

While I have specifically noted the use of an oil vehicle or suspensory medium such as fatty or mineral oil or melted paraffin wax to be used herein, I may also employ other vehicles such as glycerin or may even in some cases dispense with the suspensory medium, preparing a catalyzer preferably from the neutral or basic nickel formate as indicated, simply by heating the formate in a vessel preferably with agitation and preferably under reduced atmospheric pressure to form a nickel powder or nickel containing material having catalytic properties. In this case it is important to regulate the heating very carefully and the tank or kettle containing the formate may be heated in an oil bath or air bath, preferably as stated, while being suitably agitated. In this way superheating is avoided, while, by stirring, all parts of the material undergoing decomposition are brought into repeated contact with the walls of the vessel next to the bath and the proper temperature for decomposition is thus imparted throughout the mass. While atmospheric pressure may be used it is desirable to reduce the pressure to an extent which is represented by a vacuum of 20″ to say 29″ of mercury as indicated for example, by an ordinary dial vacuum gage. After preparing the catalyzer "dry" in this manner, it should be preserved in an inert or non-oxidizing atmosphere, or sealed in oil, wax, glycerin, benzol, etc.

The production of catalyzers by heating mixtures containing organic nickel compounds, which are readily decomposable, either alone or with the introduction of an inert gas and without the introduction of a reducing gas, and the similar treatment of like compounds of other catalytic metals, are broadly claimed in my copending applications 133,252 filed November 24, 1916, and 136,472 filed December 12, 1916.

What I claim is:—

1. The process of making a nickel catalyzer which comprises dissolving basic nickel material while in a freshly precipitated condition in formic acid, in drying to remove substantially all the moisture but without blackening of the formate, in grinding and in heating with stirring to a temperature of between 240° and 250° under reduced atmospheric pressure but in the absence of any added reducing gas, whereby catalytic material is obtained.

2. The process of making a nickel catalyzer which comprises dissolving basic nickel material while in a freshly precipitated condition in formic acid, in drying the product to remove substantially all the moisture, in grinding and in heating with stirring to a decomposing temperature under reduced atmospheric pressure and in the absence of any added reducing gas, whereby catalytic material is obtained.

3. The process of making a nickel catalyzer which comprises dissolving basic nickel material while in a freshly precipitated condition in formic acid, in drying and heating the product with stirring to a decomposing temperature in the absence of any added reducing gas, whereby catalytic material is obtained.

4. The process of making a catalyzer adapted for the hydrogenation of fatty oil, which comprises forming nickel formate substantially free from catalyzer poisons and in heating without the addition of a reducing gas to form a catalyzer.

5. The process of making a catalyzer adapted for the hydrogenation of fatty oil, which comprises forming nickel formate substantially free from catalyzer poisons and in heating in oil without the addition of a reducing gas to form a catalyzer.

6. The process of making a catalyzer adapted for the hydrogenation of fatty oil, which comprises forming nickel formate and in heating in a sealing vehicle without the addition of a reducing gas to form a catalyzer.

7. The process of making a catalyzer adapted for the hydrogenation of fatty oil, which comprises forming nickel formate substantially free from catalyzer poisons and in heating in fatty oil without the addition of a reducing gas to form a catalyzer.

8. The process of making a catalyzer which comprises heating dry nickel formate to a decomposing temperature under reduced atmospheric pressure while agitating the formate material.

9. A process of making a catalyzer which comprises adding a formate of a metal capable of serving as a hydrogenating catalyst to an oil or fat and reducing the metal therefrom by heating to about 240 to 250° C. in the absence of added reducing gases.

10. The process of making a catalyzer which comprises incorporating a formate of a metal capable of serving as a hydrogenating catalyst with an oil or fat and reducing the same by heating alone to about 240 to 250° C. in the absence of added reducing gases, under pressure materially below atmospheric.

11. A process of making a catalyzer which comprises mixing a salt of a lower fatty acid united to a metal capable of serving as a hydrogenating catalyst with an oil or fat and reducing the metal therefrom by heating to a temperature sufficient to decompose the same, but not above 250° C., in the absence of added reducing gases, under pressure materially below atmospheric.

12. The process of making a catalyzer which comprises disseminating a formate of a metal capable of serving as a hydrogenating catalyst throughout the body of an oil or fat and reducing the same by heating alone to 250° C., in the absence of added reducing gases, under pressure materially below atmospheric.

13. A catalyzer made by reducing nickel from a nickel salt of a lower fatty acid mixed with an oil or fat, by heating said material in the substantial absence of added reducing gases.

14. A catalyzer made by reducing nickel from nickel formate mixed with an oil or fat, by heating said material in the substantial absence of added reducing gases.

15. A process of making a catalyzer which comprises heating a salt of a lower fatty acid with nickel to the decomposition point and in continuously removing the gaseous products of decomposition by sweeping out with an inert gas.

16. A process of making a catalyzer which comprises heating a salt of a lower fatty acid with nickel to the decomposition point while passing a stream of inert gas through the material under treatment to drive out the non-metallic products of decomposition.

17. The process of making a catalyzer adapted for the hydrogenation of oils which comprises heating a mixture comprising oil and nickel formate to the decomposition point of said formate, whereby gaseous bodies are formed and in sweeping out said gaseous bodies at the time of formation by passing through the oily vehicle a current of an inert gas.

18. The process of making a catalyzer adapted for the hydrogenation of oils which comprises heating a readily decomposable nickel salt of a fatty acid to or above the decomposition point whereby gaseous bodies are formed, and in sweeping out said gaseous bodies by passing a current of an inert gas through the oily vehicle.

19. The process of making a catalyzer adapted for the hydrogenation of oils which comprises heating a mixture of an oily vehicle and nickel united to a lower fatty acid, to about 240-250° C., whereby gaseous bodies are formed and in sweeping out said gaseous bodies by passing a current of an inert gas through the oily vehicle.

20. The process of making a catalyzer adapted for the hydrogenation of oils which comprises incorporating a readily decomposable salt of nickel with a quantity of an oily vehicle in such proportions that the nickel content present in the mixture is substantially greater than that required in the hydrogenation of the said quantity of oil under normal hydrogenation conditions, heating such metallo-organic compound to at least the decomposition point and in removing any gaseous products of decomposition by passing a current of inert gas through the oily vehicle.

CARLETON ELLIS.